UNITED STATES PATENT OFFICE.

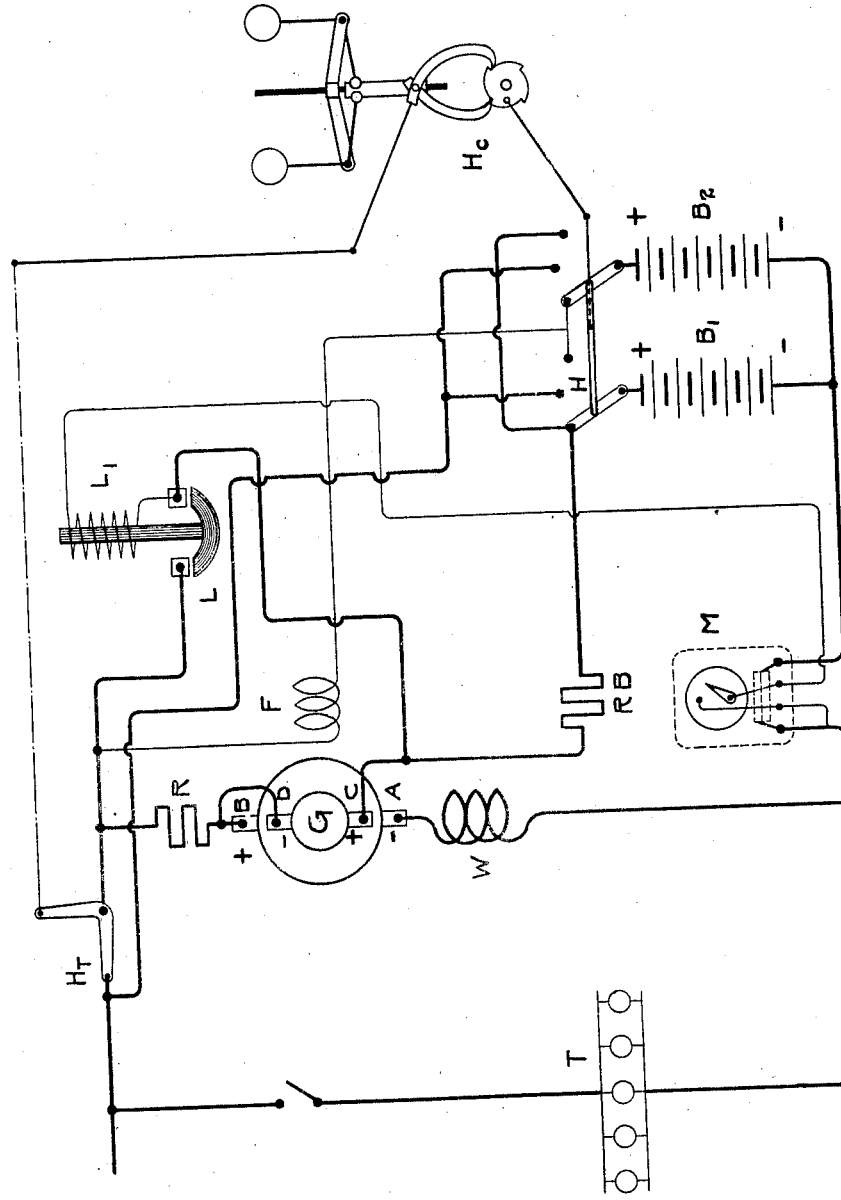

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,343,597.     Specification of Letters Patent.     Patented June 15, 1920.

Application filed November 15, 1915, Serial No. 61,589. Renewed November 5, 1919. Serial No. 335,947.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

This invention relates to system of electrical distribution.

This invention is an improvement on the system described and illustrated in U. S. Patents No. 994,510 of June 6, 1911, and No. 1,016,825, of Feb. 6, 1912, known as the Grob system. In this system a fixed resistance in the battery circuit is depended upon to prevent too high a current supply to a depleted battery. As charge proceeds, the current entering the battery would taper off, due to the increasing back pressure of the battery, but the battery charging current would never reach zero, as the charging voltage is necessarily considerably higher than the floating voltage of the battery being charged.

One of the objects of the present invention is to provide a system adapted for car-lighting which will produce close voltage regulation of the generator while charging and cause the battery to float when fully charged.

A further object is to provide an electric lighting system involving a generator and a storage battery adapted to be charged by said generator, in which system the generator is adapted to be regulated by a second storage battery whose voltage is opposed to certain of the armature windings of said generator, said system having means responsive to the state of charge of said first mentioned battery to change the relation of the regulating battery to the armature windings whereby to reduce the charging voltage of the generator to the floating voltage of said first mentioned battery.

Other objects will be apparent as the description proceeds.

The one figure of the drawing represents diagrammatically one embodiment of my invention.

A and B represent the brushes bearing on the commutator, connecting with one armature winding of the generator G, and C and D another set of brushes bearing on a second commutator which is connected with an auxiliary armature winding. F is the exciting field winding and W is a compensating winding which may carry the full generator current output and which is employed to nullify the armature reaction. Two batteries are employed in this system, shown as $B^1$ and $B^2$, one of which discharges slightly to furnish the exciting current for the generator, effective through coil F, while the other receives a charging current from the generator. A switching mechanism H is provided, actuated by centrifugal means $Hc$ attached to the generator shaft. The centrifugal means $Hc$ serves to throw the switching mechanism to either the right hand or the left hand position when the generator operates above a certain predetermined speed. As shown in the drawing, the switching mechanism H has been thrown to the left hand position, connecting the battery $B^1$, to be charged and connecting the battery $B^2$ to supply the excitation current for the coil F. When the generator speed falls below the predetermined point, the centrifugal means will operate to throw the switching mechanism to its mid position and will, at the same time, open the switch $H_T$, so that the generator is disconnected from the translation circuit T and the batteries $B^1$ and $B^2$ are connected in parallel to supply said translation circuit. Upon the generator speed again rising above the predetermined point, the centrifugal means operates to throw the switching means H to the right hand position, at the same time closing the switch $H_T$. The batteries are thus transposed from their first connection. It will be apparent that each speeding up and slowing down of the generator will cause the centrifugal means to operate the switching mechanism H, the resultant action being an oscillating movement of said switching mechanism, transposing the connections of the batteries. The centrifugal means and the switching mechanism have not been illustrated nor described in detail, as they are already known and form no part of the present invention.

The system involved in the present invention is designed to produce a constant voltage at the generator terminals by reason of the fact that the generator field is excited by the difference between two opposing sources of voltage, one of which is substantially constant. One of the storage batteries, such as B² in the figure, slightly discharging to furnish the exciting current, represents the constant voltage source, while the generator armature conductors between brushes A and B provide the opposing force and it is obvious that the voltage of the armature cannot exceed that of the battery B² as this would imply that the exciting current through the field winding F would have to pass through zero value, and in fact become reversed, which, of course, would be a physical impossibility.

In this system, as the voltage effective at the main brushes A, B, is always slightly under that of the battery which furnishes the excitation, it is obvious that a second battery, having the same number of cells, could not be charged by the generator and therefore, a second armature winding is furnished, which has about 20% of the number of turns of the main armature winding and therefore develops across its commutator a voltage having 20% of the voltage developed across the main brushes, and by connecting these two armature windings in series, as shown in the drawing, the sum of these two electro-motive forces can be utilized to insure that the battery B¹ will be furnished with a suitable charging current. The voltages, however, developed across the main brushes A, B, and the auxiliary brushes C, D, bear a fixed relation so that the charging voltage for the battery B¹, effective across brushes A, C, is a constant voltage and in order to limit the current which enters the charging battery B¹, which might at times be in a somewhat depleted state, a fixed resistance RB is interposed in the charging circuit.

Assuming a system employing 16 cells, the exciting battery B² may be assumed to have an average value of 32 volts across its terminals and this value but slightly reduced, would exist across the lamp circuit connecting with the main brushes, A, B, so that substantially 38 volts would exist across the brushes A, C, this being the sum of the voltages developed across brushes A, B, and C, D, this being the effective voltage supplied the charging battery. In a system such as described up to this point, the charging current entering the battery would rapidly taper off as the back pressure increased, but would never reach zero, as 38 volts is considerably higher than the floating voltage of 16 cells. The ampere hour meter M is provided to cut down the charging voltage when the battery is fully charged. The ampere hour meter may be of any preferred type. It preferably consists of a compensating meter which will register the ampere hours delivered in a charging direction and will automatically change its rate on discharge to compensate for internal battery losses, so as at all times to accurately indicate the state of battery charge. It will be noted that the meter M is connected to measure the current flowing from the generator to either battery, no matter which battery is in the charging circuit. The current discharged by the batteries to the lamps causes the meter to operate in a reverse direction, so that the meter registers the summation of the charge in the two batteries. As shown in the drawing, when the generator slows down below the critical speed, the switching mechanism acts to disconnect both batteries from the generator and, at the same time, connects both batteries in parallel across the lamp circuit. Under this condition, both batteries will contribute current to the lamp circuit in proportion to their capacities and furthermore, a current will flow from the more highly charged battery to the other battery. Thus, in actual service, the batteries will tend to maintain equal states of charge.

It will be noted that the comparatively slight amount of excitation current flowing from battery B² is not registered by the meter M. This discharge from battery B² passes through coil F, resistance R, is boosted up by the voltage across the brushes D, C, and helps to charge the battery B¹. What is taken from battery B² is added to battery B¹, so that the summation of charge of the two batteries is not affected by the excitation current. The meter M, therefore, at all times, indicates the summation of charge in the two batteries and, since the batteries tend to equalize, it also indicates when the battery on charge has been fully charged.

At L is indicated a switch furnished with a solenoid winding L¹ which is connected across the battery B¹ when the contact points of the ampere hour meter are engaged, as when the battery B¹ has received the predetermined number of ampere hours charge. Closure of the switch L has the effect of connecting the left hand terminal of the field winding F to the line leading from the brush C, so that now the voltage developed across the brushes A, C, connecting with the storage battery will be reduced to the value which formerly existed across brushes A and B, or substantially the 32 volts which exist across the exciting battery B². The voltage across brushes A and B will, of course, be correspondingly reduced, but nevertheless, the same terminal voltage will be maintained across the lamp circuit, which will be supplied by the brushes A and C. The resistance R, in addition to its function in the Grob system, has the added function in the present invention of preventing a short circuit of the armature windings across brushes D and C.

It will be obvious that the windings to which the brushes A—B and C—D are connected, may be parts of the same armature structure or may be parts of separate armatures.

One system has been described and illustrated herein for the purpose of clearly pointing out the principles of the invention, but it is obvious that many modifications may be made which will embody the principles of the invention as defined in the appended claims.

What I claim as new and desire to secure by Letters Patent of the United States is—

1. In a system of electrical distribution, a source of E. M. F. provided with armature windings and a field winding, an extraneous source of substantially constant E. M. F. connected through said field winding across a portion of said armature windings to oppose the E. M. F. produced in said portion, and means for connecting said extraneous source across the whole of said armature windings for regulating the output of said armature windings.

2. In a system of electrical distribution, a storage battery to be charged, a source of E. M. F. provided with armature windings and a field winding, an extraneous source of substantially constant E. M. F. connected through said field winding across a portion of said armature windings to oppose the E. M. F. produced in said portion, and means responsive to the state of charge of said storage battery for connecting said extraneous source across the whole of said armature windings for regulating the output of said armature windings.

3. In a system of electrical distribution, a source of E. M. F. provided with armature windings and a field winding, a translation circuit, a circuit containing a pair of storage batteries, one of which is used as a regulating battery and the other of which is to be charged, means whereby said batteries may be transposed or connected in parallel to supply the translation circuit, the regulating battery being connected through said field windings across a portion of said armature windings, and battery charge determining means located in the battery circuit adapted when the charging battery is fully charged to vary the effect of the regulating battery.

4. In a system of electrical distribution, a generator, an extraneous source of substantially constant E. M. F. connected to the armature circuit of said generator for regulating purposes, a battery, an ampere hour meter connected to measure the state of battery charge, and means controlled by said ampere hour meter for changing the connections of the extraneous source to vary the standard of regulation.

5. In a system of electrical distribution, a source of E. M. F. provided with armature windings and a field winding, a translation circuit, a pair of storage batteries, one of which is connected through the field winding across a portion of said armature windings for regulating purposes, means for transposing said batteries and for connecting said batteries in parallel across the translation circuit whereby the batteries tend to become equalized, a battery charge-measuring means connected in circuit between the generator and the batteries, and means controlled by said charge-measuring means for connecting said regulating battery through said field winding across the whole of said windings whereby to vary the standard of regulation.

6. In a system of electrical distribution, a source of E. M. F. provided with armature windings and a field winding, means in circuit with the field winding for opposing said E. M. F. due to a portion of said armature windings, a battery, battery charge-measuring means, and means controlled by said battery charge-measuring means whereby said means in circuit with the field winding is connected to oppose the E. M. F. due to a greater portion of said armature windings.

In witness whereof, I have hereunto subscribed my name.

WILLIAM A. TURBAYNE.